United States Patent
Candy (10) Patent No.: US 6,653,838 B2
(45) Date of Patent: Nov. 25, 2003

(54) GROUND MINERALIZATION REJECTING METAL DETECTOR (TRANSMIT SIGNAL)

(75) Inventor: Bruce Halcro Candy, Basket Range (AU)

(73) Assignee: BHC Consulting PTY Ltd., Glenside (AU)

(*) Notice: Subject to any disclaimer, the term of this patent is extended or adjusted under 35 U.S.C. 154(b) by 0 days.

(21) Appl. No.: 09/978,211

(22) Filed: Oct. 17, 2001

(65) Prior Publication Data

US 2002/0050822 A1 May 2, 2002

(30) Foreign Application Priority Data

Oct. 17, 2000 (AU) .............................................. PR0837

(51) Int. Cl.[7] .............................. G01V 3/10; G01V 3/11; G01V 3/165
(52) U.S. Cl. ........................ 324/329; 324/239; 324/336
(58) Field of Search ................................ 324/225, 239, 324/327–330, 334, 336

(56) References Cited

U.S. PATENT DOCUMENTS

| | | | | |
|---|---|---|---|---|
| 3,836,842 A | * | 9/1974 | Zimmermann et al. | 324/239 |
| 4,276,484 A | * | 6/1981 | Riveros | 324/334 X |
| 4,535,292 A | * | 8/1985 | Ensing | 324/330 |
| 4,868,504 A | * | 9/1989 | Johnson | 324/329 |
| 5,059,902 A | * | 10/1991 | Linder | 324/239 X |
| 5,525,907 A | * | 6/1996 | Frazier | 324/334 |
| 5,537,041 A | | 7/1996 | Candy | 324/329 |
| 5,576,624 A | | 11/1996 | Candy | 324/329 |

\* cited by examiner

*Primary Examiner*—Gerard R. Strecker
(74) *Attorney, Agent, or Firm*—Finnegan, Henderson, Farabow, Garrett & Dunner, L.L.P.

(57) ABSTRACT

A metal detector with a transmit coil which transmits a magnetic field, transmit timing control circuitry, and receive signal circuitry and receive signal processing circuitry, and a low voltage and a high voltage power supply. The timing sequence generated within the transmit timing control circuitry produces control signals such that there are at least two different transmit periods, a short and a long period, and such that there are periods when no current flows through the transmit coil. The timing sequence is such that an average transmit coil energy at termination of the long periods is similar to that of an average transmit coil energy at termination of the short periods.

6 Claims, 6 Drawing Sheets

GROUND MINERALIZATION REJECTING METAL DETECTOR (TRANSMIT SIGNAL)

BACKGROUND OF THE INVENTION

In U.S. Pat. No. 5,576,624 I disclosed a metal detector apparatus which is capable of substantially reducing signals arising from ground mineralisation containing magnetic soils. Several models utilizing these principles have been commercialised and used highly successfully by gold prospectors and for land mine detection. Whilst the improvement compared to other extant metal detectors was considerable, further improvements relating to improved signal-to-noise ratio and bipolar transmit fields are disclosed herein.

The current de-mining metal detectors products utilizing the principles of my patent are unacceptable to some military organizations because of their uni-polar transmitted field; these organisations require metal detectors to transmit net zero magnetic fields so that, so called "smart mines", which respond to slow changes in the environmental static magnetic field (for example caused by perturbations to the earth's field by moving tanks), are not detonated by the metal detector. Gold prospectors always wish to find gold at greater depths.

An object of this invention is to improve upon the ability of metal detectors to locate targets at greater depths, and to produce a bi-polar magnetic field of zero net flux.

In U.S. Pat. No. 6,5766,241 disclosed a metal detector apparatus which transmits a pulse induction waveform.

The advantages of pulse sequences containing pulses of different duration are disclosed. The received signal response from magnetic soils is approximately the same for all such soils (except for the overall amplitude).

In contrast, the response from metal targets vary substantially. Hence if a proportion of one part of the received signal is subtracted from a linear combination of a different part of the received signal, it is possible to select the coefficients of the said linear combination such that the response from magnetic soils are cancelled. In general, a particular said linear combination resulting in magnetic soil signal cancellation, a first linear combination, will not result in cancellation of most metal targets, except for some particular metal targets with a particular eddy current time constant decay, a first eddy current decay time constant, which happens to also result in a zero first linear combination result. In order to detect targets with the said first eddy current decay time constant, a different linear combination of different sampled receive signals, a second linear combination, is required to cancel magnetic soil response and not cancel the said first eddy current time constant decay signal. Likewise the said second linear combination will cancel a particular metal eddy current decay signal, a second eddy current time constant decay, which will not be cancelled by the said first linear combination if chosen appropriately. Thus by simultaneously measuring and calculating at least two different linear combinations, all metal targets may be detected and magnetic soil signals approximately cancelled.

In U.S. Pat. No. 5,576,624 I disclosed a metal detector apparatus which is insensitive to induced e.m.f. signals from movement of a search coil relative to the earth's magnetic field and magneto fields from magnetic soils and rocks. This is achieved by selecting the total integrated receive signal over a complete cycle to be zero.

An object of this invention is to improve the efficiency of a metal detector apparatus of this general type.

In one form of this invention it can be said to reside in a metal detector apparatus including a transmit coil adapted to transmit a magnetic field when operating with electrical current flowing through the said transmit coil, transmit timing control circuitry, and receive signal circuitry and receive signal processing circuitry;

and at least two power supplies, a first and a second power supply, one adapted to provide a low voltage when operating of between 3 and 30V, and the other adapted to provide a high voltage when operating of between 75 and 400V, a first switch being adapted to connect the coil to the said first power supply, which may be via a diode, or diodes or passive components or both, a second switch being adapted to connect the coil to the said second power supply, which may be via a diode, or diodes or passive components or both, a third diode or switch being adapted to connect the said transmit coil to the said second power supply, which may De via other diodes or passive components when a back e.m.f. from the coil causes current flow in one particular direction, a fourth diode or switch being adapted to connect the said transmit coil to the said second power supply, which may be via other diodes or passive components when a back e.m.f. from the coil causes current flow in another particular direction, the timing sequence adapted to be generated within the transmit timing control circuitry being adapted to produce control signals for the said switches, and the said timing sequence being adapted and otherwise connected so as to control the said switches such that there are periods when no current flows through the transmit coil.

In preference, in a further form of this invention, this can be said to reside in a metal detector apparatus including a transmit coil adapted to transmit a magnetic field when operating with electrical current flowing through the said transmit coil, transmit timing control circuitry, and at least two power supplies, a first and a second power supply, wherein the voltage of the one supply is different to the other when operating, and receive signal circuitry and receive signal processing circuitry;

and at least two switches, a first switch being adapted to connect the coil to the said first power supply, which may be via a diode, or diodes or passive components or both, a second switch being adapted to connect the call to the said second power supply, which may be via a diode, or diodes or passive components or both, a third diode or switch is adapted to connect the said transmit coil to a third voltage supply, when current resulting from a back e.m.f. from the coil is flowing, the timing sequence generated within the transmit timing control circuitry is adapted to produce control signals for the said switches, wherein there are at least two different transmit periods, a shot and a long period, and the said timing sequence being adapted to control the said switches such that there are periods when no current flows through the transmit coil, and the said timing sequence Is selected to control the said switches such that an average transmit coil energy at termination of the long periods is similar to that of an average transmit coil energy at termination of the short periods, and the said timing sequence being further arranged to control the said switches such that the long pulse is at least 3 times the duration of the short pulse.

In preference one power supply is replaced by a direct connection to ground potential and the timing sequence generated within the transmit timing control circuitry is adapted to produce control signals for the switches, wherein there are at least two different transmit periods, a short and a long period;

wherein during the long period, the first switch is pulsed on and off, and the second switch is turned on at least during periods when the first switch Is turned off.

In preference, in a further form of this invention it can be said to reside in a metal detector apparatus including a transmit coil adapted to transmit a magnetic field when operating with electrical current flowing through the said transmit coil, transmit timing control circuitry, and at least one power supply, a fourth power supply, and receive signal circuitry and receive signal processing circuitry:

and at least two switches;

a fourth switch, is adapted to connect the coil to the said third power supply, which may be via a diode, or diodes or passive components or both, and a fifth switch, is adapted to connect the coil to 0 volts or ground potential, which may be via a diode, or diodes or passive components or both, a sixth diode or switch Is adapted to clamp the said transmit coil voltage to a fourth voltage supply, when current resulting from a back e.m.f. from the coil is flowing, and the timing sequence generated within the transmit timing control circuitry is adapted to produce control signals for the said switches, wherein there are at least two different transmit periods, a short and a long period, wherein during the long period, the fourth is pulsed on and off and the fifth switch is turned on at least during periods when the fourth switch is tuned off, and the said timing sequence is selected to control the said switches such that there are periods when no current flows through the transmit coil, and the said timing sequence is selected to control the said switches such that the total transmit coil energy at the termination of the long periods is similar to that of the total transmit coil energy at the termination of the short periods, and the said timing sequence is selected to control the said switches such that the long pulse is at least 3 times the duration of the short pulse.

In preference, in a further form of this invention it can be said to reside in a metal detector apparatus Including a transmit coil adapted to transmit a magneto field when operating with electrical current flowing through the said transmit coil, transmit timing control circuitry, and receive signal circuitry and receive signal processing circuitry;

and at least two power supplies, a fifth and a sixth power supply, wherein the voltage of the one supply is different to the other when operating, a sixth switch is adapted to connect the coil to the said fifth power supply, which may be via a diode, or diodes or passive components or both, a seventh switch is adapted to connect the coil to the said sixth power supply, which may be via a diode, or diodes or passive components or both, an eighth diode or switch is adapted to clamp the said transmit coil voltage to the said sixth power supply, when current resulting from a back e.m.f from the coil is flowing in one particular direction, a ninth diode or switch is adapted to clamp the said transmit coil voltage to the fifth power supply, when current resulting from a back e.m.f. from the coil is flowing in another particular direction, the timing sequence generated within the transmit timing control circuitry is adapted to produce control signals for the said switches, wherein there are at least two different transmit periods, a short and a long period, and the said timing sequence is adapted to control the said switches such that there are periods when no current flows through the transmit coil, and the said timing sequence is selected to control the said switches such that the total transmit coil energy at the termination of the long periods Is similar to that of the total transmit coil energy at the termination of the short periods, and the said timing sequence is selected to control the said switches such that the long pulse is at least 3 times the duration of the short pulse, and the e.m.f. of the fifth power supply is at least double that of the sixth power supply.

In preference one power supply is replaced by a direct connection to ground potential the timing sequence generated within the transmit timing control circuitry is adapted to produce control signals for the said switches, wherein there are at least two different transmit periods, a short and a long period;

wherein during the long period, the sixth is pulsed on and off, and the seventh switch is turned on at least during periods when the sixth switch is turned off.

BRIEF DESCRIPTION OF THE DRAWINGS

For a better understanding of this invention this will now be described with reference to a preferred embodiment which shall be described with the assistance of drawings wherein.

DETAILED DESCRIPTION OF THE INVENTION DESCRIPTION OF THE PREFERRED EMBODIMENT

Most pulse induction metal detectors transmit a mono-polar transmit signal generated by applying a voltage to a transmit coil, which may also be used for receiving, of typically negative several volts for typically several tens or hundreds of microseconds, and at the cessation of this applied voltage, the resulting back e.m.f. is typically clamped to a few hundred volts and the energy thus dissipated as heat.

Figure 1:
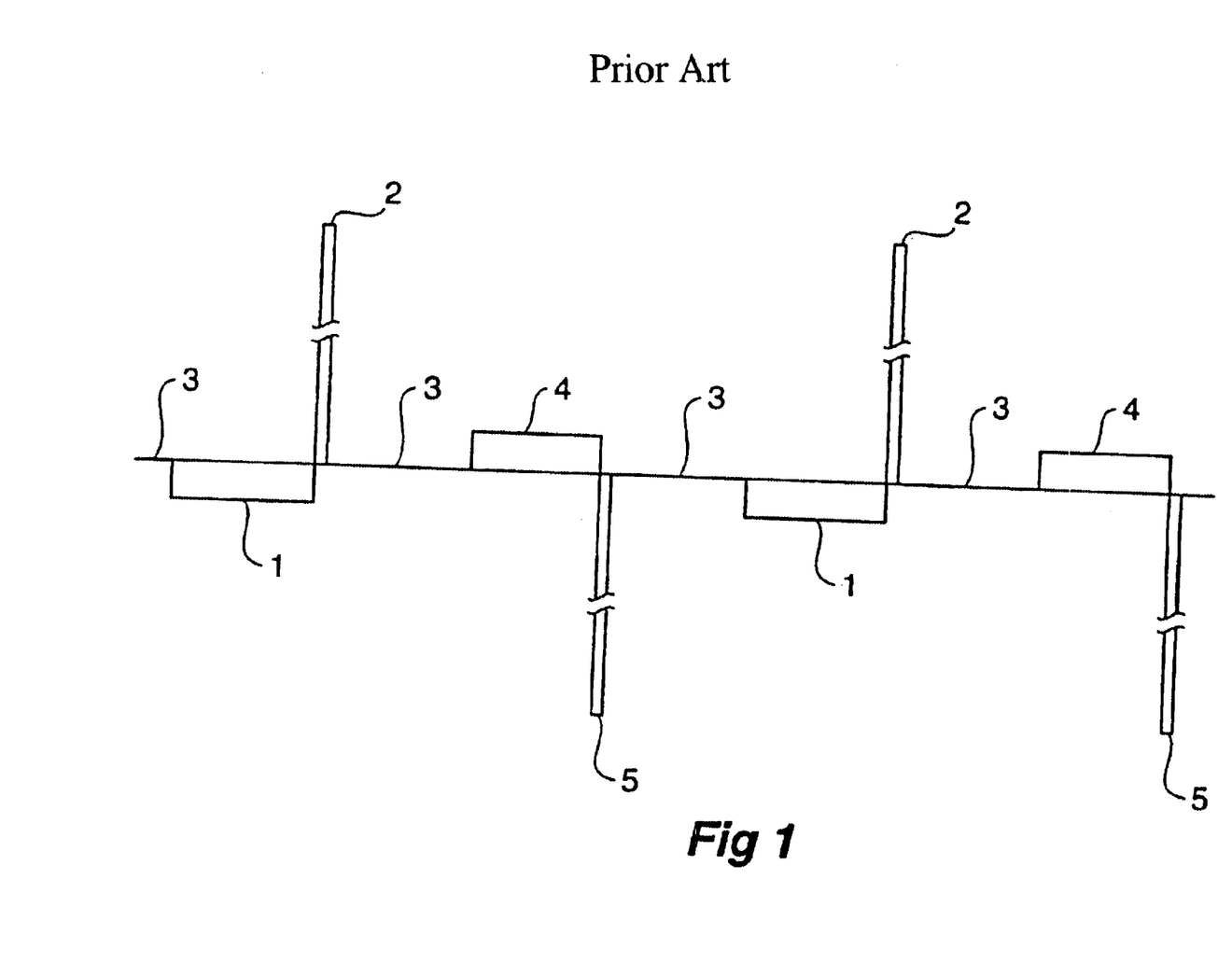
FIG. 1 shows a prior art symmetric bi-polar pulse induction transmit voltage waveform.

Some bi-polar pulse induction detectors, which are fairly rare, transmit a complementary voltage waveform. If the transmit coil is simultaneously to be used as a receive coil, this results in a fairy complex transmit/receive electronic switch being required if the receiver is to be a low noise type. A typical example of this bi-polar voltage waveform is shown in FIG. 1. Here 2 cycles are shown. During period 1 several volts negative is generated across the transmit coil, period 2 is the back e.m.f. clamped at a few hundred volts positive, period 3 is at 0 volts when no magnetic field is transmitted and the receiver is active. Period 4 is at an applied several volts positive, and 5 is the back e.m.f. clamped at a few hundred volts negative.

Figure 2:
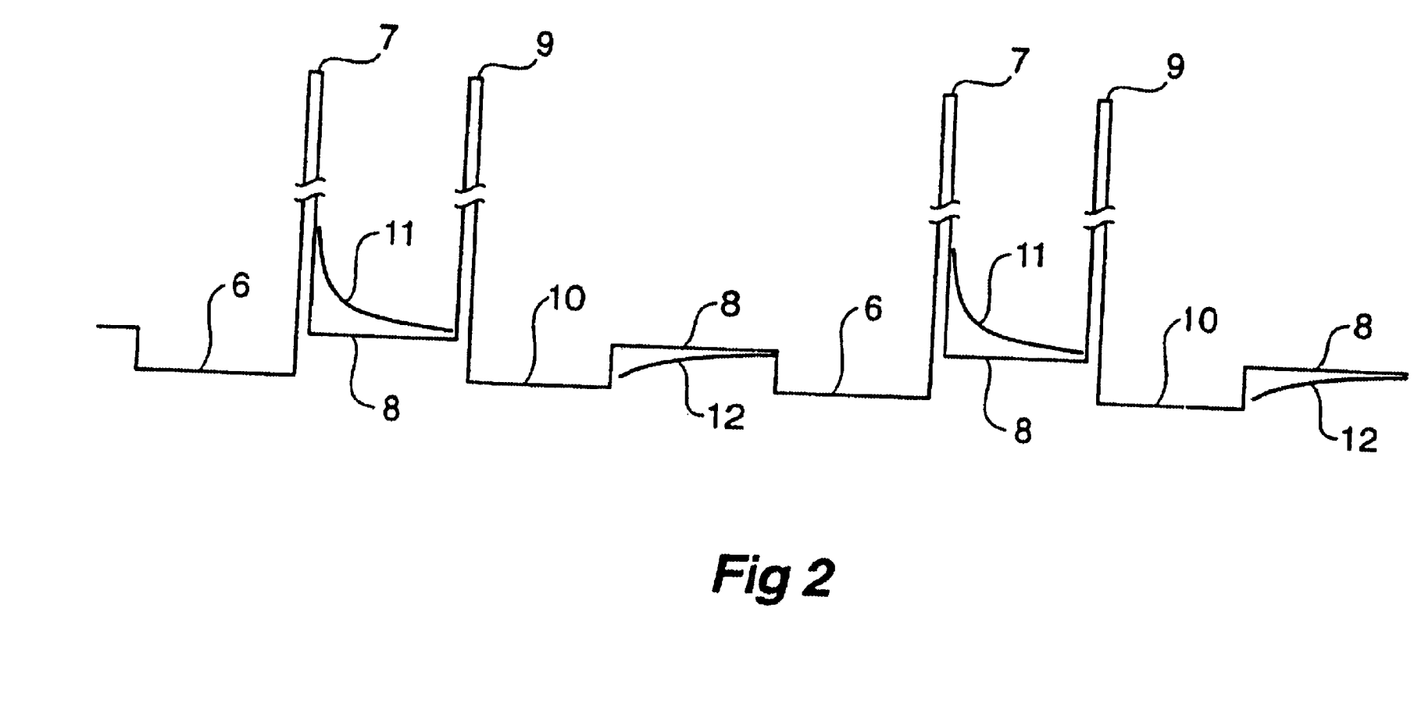
FIG. 2 illustrates an example of a bipolar transmit voltage waveform according to a first embodiment wherein the voltages in this example include both the typical low and high voltage signals found in most conventional pulse induction detectors.

A simpler means of achieving a bi-polar signal is to follow the conventional pulse induction signal with a "time reversed signal", that is, following the usual mono-polar signal by the application a high voltage signal of a few hundred volts to the transmit coil and then allowing the back e.m.f. to be clamped by the said negative several volt supply. As an example of such a signal, FIG. 2 shows two cycles. Period 6 is at an applied several volts negative, period 7 is the back e.m.f, clamped at a few hundred volts positive, and period 8 is at 0 volts when no magnetic field is transmitted and the receiver is active. So far this is the typical mono-polar pulse induction waveform. Period 9 is when a few hundred volts positive is applied to the transmit coil, and 10 is the back e.m.f. clamped at several volts negative. Once this field has collapsed period 8 follows during which no field is transmitted. Here it is simplest if the same power supply of several volts negative provides energy to the transmit coil during period 6 and receives energy during the back e.m.f. period 10, and also if the same power supply of a few hundred volts positive provides energy to the transmit coil during period 9 and receives energy during the back e.m.f. period 7. Signals 11 and 12 show a typical soil plus target receive response.

Figure 3:
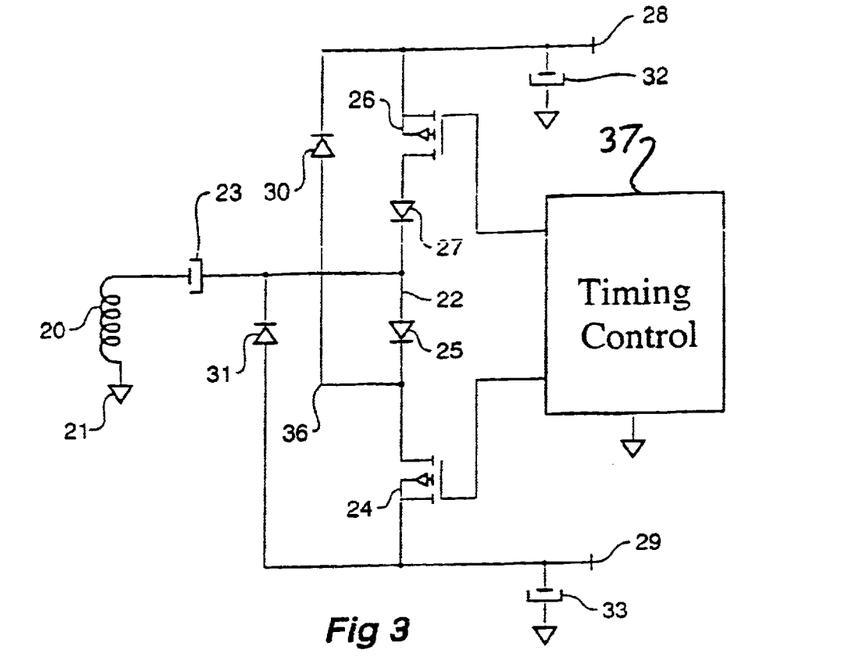
FIG. 3 is an example of a circuit diagram for transmitting a signal such as that in FIG. 2 in which there is no average net mono-polar magnetic field.

To ensure a zero net magnetic flux, a capacitor may be connected in series with the transmit coil. This is shown in FIG. 3 which is an example of a transmit signal generator capable of generating the waveform shown in FIG. 2. Here a D.C. blocking capacitor 23 is in series with the transmit coil 20 which is connected to ground 21. Switch 24, an N-channel FET as shown, is connected between a negative supply voltage rail 29 of several volts and node 22 via a series diode 25 Capacitor 23 is connected to 22. Switch 26, a P-channel FET as shown, is connected between a high voltage positive supply rail 28 of a few hundred volts and node 22 via a series diode 27. A diode 30 is connected between 28 and 22 or as shown 36, the node connecting 24 and 25. The back e.m.f. clamping current flows through this diode. A diode 31 is connected between 29 and 22 or the node connecting 26 and 27. The back e.m.f. clamping current resulting from period 10 in FIG. 2 flows through this diode. 28 is A/C coupled to ground via capacitor 32 and 29 is A/C coupled to ground via capacitor 33. Timing signals generated in the transmit timing control circuitry 37, are applied to the gates of the switching FETs. There are many possible variations in the possible sequences; for example, the basic cycle may consist of two "6-7-8" pulse sequences followed by a single "9-10-8" pulse sequence.

At the time of this application, the "low voltage" supplies of "several volts" are most useful if between 3 and 30V and "high voltage" supplies of a "few hundred" volts are most useful if between 75 and 400V.

Further, the apparatus disclosed as examples in U.S. Pat. No. 5,576,624 shows transmission of uni-polar pulses of different periods. The relative difference between magnetic soil signals and metal targets is higher when the relative difference in period is higher. However, assuming that the time constant of the transmit coil circuitry, that is it's inductance divided by its resistance plus the impedance of the transmit electronic driving circuitry, is reasonably longer than the longer transmit period, then the transmit coil peak current is a little less than Vt/L, where V is the voltage applied to the transmit coil, t is the pulse period and L is the coil's inductance. The energy in the transmit coil at the ion of a transmit pulse is a little less than $(Vt)^2/(2L)$. Thus if V, a first voltage, is the same for the longer and shorter pulses and the ratio of the periods between the long and short pulses is n, then the ratio between the energy at the cessation of the longer and shorter pulses is approximately $n^2$.

Thus in order to transmit roughly the same total energy for short and long pulses, there need be approximately $n^2$ as many short pulses in a basic cycle as the long pulse. This means that the ratio of a basic cycle associated with short pulses is approximately n times longer for the short pulses than for the long pulses. This means that the total period of one basic cycle need be fairly long if n>>1. This will result in a low frequency fundamental; an undesirable feature in terms of environmental susceptibility to noise.

An improvement is to generate an additional power supply with a voltage V1 of the order of the square root of (n) times more than V. If V1=mV, where m is of the order of sqrt(n), and there are say 1 long pulse and p short pulses in one basic cycle, then the ratio of the total energy of the short pulses compared to the long pulses is $p(m/n)^2$. Thus if $p(m/n)^2$ is of the order of 1 then the time associated with the short pulses may be similar to the long pulse for the same relative accumulated target and magnetic soil signals for improved signal-to-noise ratio.

Figure 4:
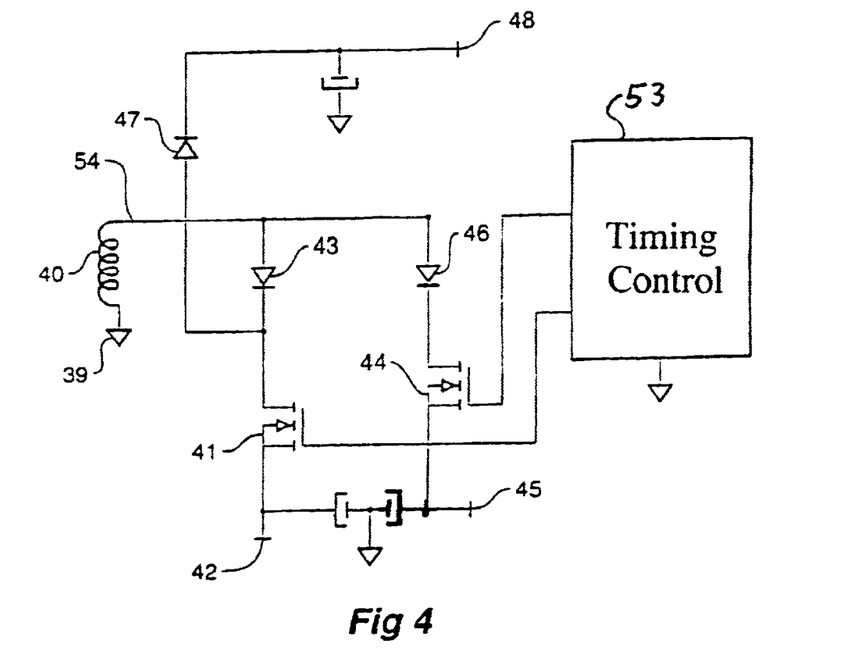
FIG. 4 is an example of a mono-polar pulse induction transmit signal generator according to a second embodiment which generates at least two low voltages, plus zero volts, and the usual high voltage back e.m.f., that is a total of four different voltages ignoring the transition signals.

A mono-polar circuit capable of applying 3 different voltages plus zero volts across the coil is shown in FIG. 4. The transmit coil 40 is connected to ground 39 and switched to [a third] power supply 42 by means of switch 41, as shown a N-channel FET which may be either directly connected to the transmit coil or connected via diode, 43 as shown, or diodes or passive components or both. The transmit coil 40 is switched to a power supply 45 by means of switch 44, as shown an N-channel FET which may be either directly connected to the transmit coil or connected via diode 46 as shown, or diodes or passive components or both. The back e.m.f. is clamped to supply 48 via diode 47 which may be connected between 48 and the node 54 connecting 40, 43 and 46, or between 48 and the node connecting 41 and 43, or between 48 and the node connecting 46 and 44. Signals from the transmit timing control generating circuitry 53 control switches 41 and 44.

Capacitors 50, 51, and 52, are connected to ground and to power supplies 42, 45, and 48, respectively.

Figure 5:
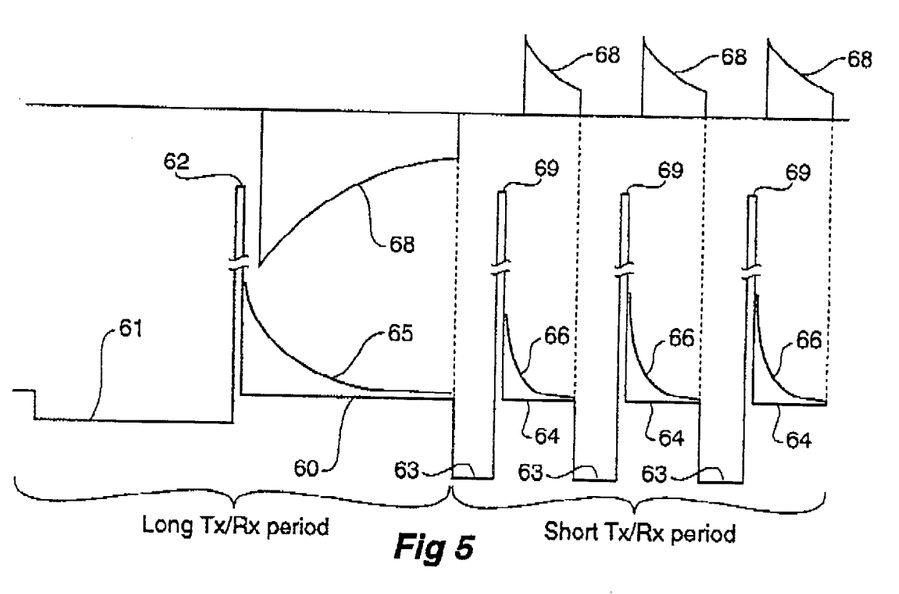
FIG. 5 is an example of a bi-polar pulse induction transmit coil signal voltage waveform which includes the said four different transmit signal voltages and also typical receive waveforms.

Suppose that there are three short pulses and one long pulse in a transmit cycle as shown in FIG. 5. Here one switch, say 41, is turned on and switches the transmit coil to supply 42, shown as period 61 in FIG. 5, which may be less the voltage drop across diode 43 and switch 41. During the period shown as 61, transmit coil current increases. When switch 41 is turned off the resultant back e.m.f. is clamped to the voltage at 48, plus the voltage drop across diodes 43 and 47 as shown as period 62 in FIG. 5. Once the coil current has ceased, the voltage across the transmit coil returns to zero volts. (This assumes the usual damping circuitry.) After a period 60 as shown in FIG. 5, the other switch 44 is turned on and switches the transmit coil to supply 45, shown as 63 in FIG. 5, which may be less the voltage drop across diode 46 plus switch 44. During the period shown as 63, transmit coil current increases to say about the square root of the peak transmit current at the end of period 61. At this point, switch 44 is turned off and the resultant back e.m.f. is clamped to the voltage at 48, plus the voltage drop across diodes 43 and 47. This is shown as period 69 in FIG. 5. Once the coil current has ceased, the voltage across the transmit coil returns to zero volts. After a period 64 as shown in FIG. 5, this short pulse sequence is repeated twice as shown. 65 indicates the decay signal from an environment containing metal and soil following the long transmit pulse and 66 that following each short pulse. Note that the mean energy of the long pulse is similar to that of the short pulses in the same sequence and as shown, the total period associated with the transmission and received signal of the long pulse is similar to that of the short pulses.

Figure 6:
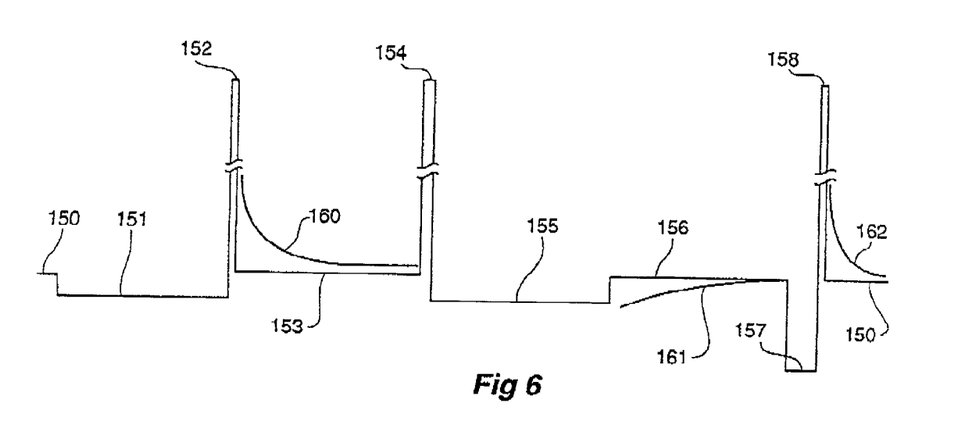
FIG. 6 is an example of voltage waveforms capable of being generated by electronic circuitry shown in FIG. 3.

The concepts described above can all be included into a bi-polar pulse induction metal detector. FIG. 6 shows an example of a transmit signal voltage waveform including a long period low voltage period 151 of a first polarity during which current increases in a first direction an hence transmitted magnetic field. A very short duration back e.m.f. period 152 of a second polarity at a high voltage follows 151, during which period the transmit current built up during 151 decays to zero. A non-transmission and receiving period 153 of similar duration to 151, follows 152. This is followed by a very short period high voltage period 154 of a second polarity during which current increases in a second direction an hence transmitted magnetic field. This is followed by a long duration back e.m.f. period 155 of a first polarity at a low voltage, during which period the transmit current built up during 194 decays to zero. A non-transmission and receiving period 156 of similar duration to 155, follows 155.

Thus far the sequence is the same as that of 1 cycle of FIG. 2. This is followed by a short low voltage period 157 of a first polarity during which current increases in a first direction and hence transmitted magnetic field. This is followed by a very short duration back e.m.f. period 158 of a second polarity at a high voltage, during which period the transmit current built up during 157 decays to zero. A non-transmission and receiving period 150 of longer duration to 157, follows 158. The voltage applied to the transmit coil during 157 is substantially greater than that applied during 151. The "157-158-150" sequence is similar to one "63-69-64" sequence in FIG. 5. Typical receive signals are shown as 160 during period 153, 161 during period 156 and 162 during period 150. Each one of these periods results in a different typical target signal-to-magnetic soil signal ratio and thus assists with discrimination between the two.

Figure 7:
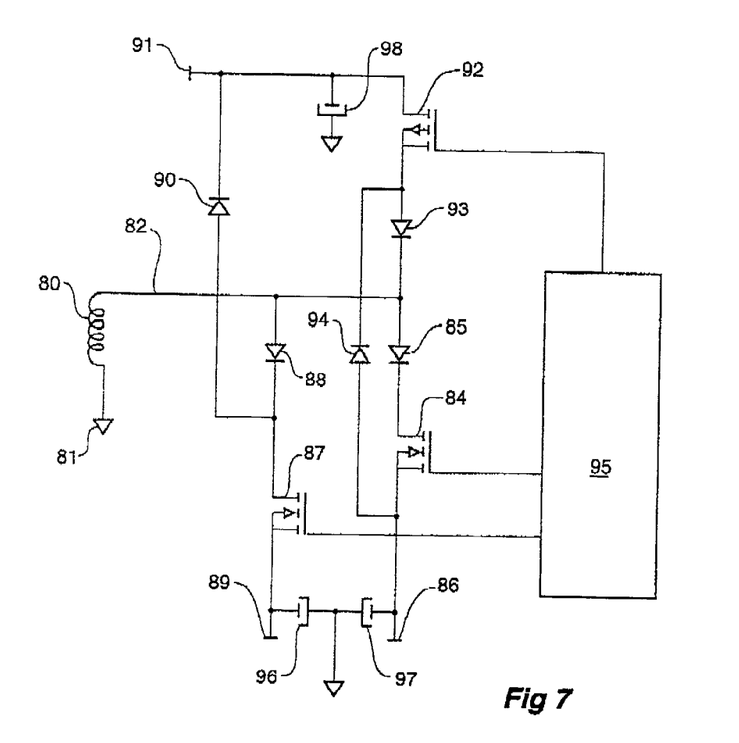
FIG. 7 is an example of a circuit capable of generating bipolar transmit magnetic signals, and also a different transmit coil drive voltages.

FIG. 7 shows an example of a transmit voltage generating circuit capable of transmitting the waveform shown in FIG. 6. This is basically a combination of elements given in FIGS. 3 and 4. A transmit coil 80 is connected to ground 81. Switch 87, an N-channel FET as shown, is connected between a negative supply voltage rail 89 of several volts and node 82 via a series diode 88 where 82 is the node at the non-ground end of 80. Switch 84, an N-channel FET as shown, is connected between a negative supply voltage rail 86 of several volts and node 82 via a series diode 85. Switch 92, a P-channel FET as shown, is connected between a high voltage positive supply rail 91 of a few hundred volts and node 82 via a series diode 93. A diode 90 is connected between 91 and 82 or as shown the node connecting 88 and 87. The back e.m.f. clamping current built up when 87 or 84 are closed and then opened flows through this diode. A diode 94 is connected between 86 and 82 or as shown the node connecting 92 and 93. The back e.m.f. clamping current built up when 92 is closed and then opened flows through this diode. 89 is A/C coupled to ground via capacitor 96, 86 is A/C coupled to ground via capacitor 97 and 91 is A/C coupled to ground via capacitor 98. Timing signals generated in the transmit timing control circuitry 95, are applied to the gates of the switching FETs. There are many possible variations in the possible sequences; for example, the basic cycle may consist of two "157-158-150" pulse sequences may follow a single "151-152-153-154-155-156" pulse sequence. Here the "low voltage" supplies of "several volts" are most useful if between 3 and 30V and "high voltage" supplies of a "few hundred" volts are mast useful if between 76 and 400V. The voltage shown during period 157 should be at least double that shown during period 151 to be practically effective.

The long pulse and medium pulse period may be effectively generated using just one supply voltage rather than two as shown in FIG. 6, but with similar durations and peak transmit coil currents. This may be achieved by using the higher low supply voltage and switching the coil between the said higher low supply voltage and zero, or at least a forward diode voltage drop away from zero volts, so that the current increase is similar in trend to that obtained when the lower low voltage is applied continuously across for the said period.

Figure 8:
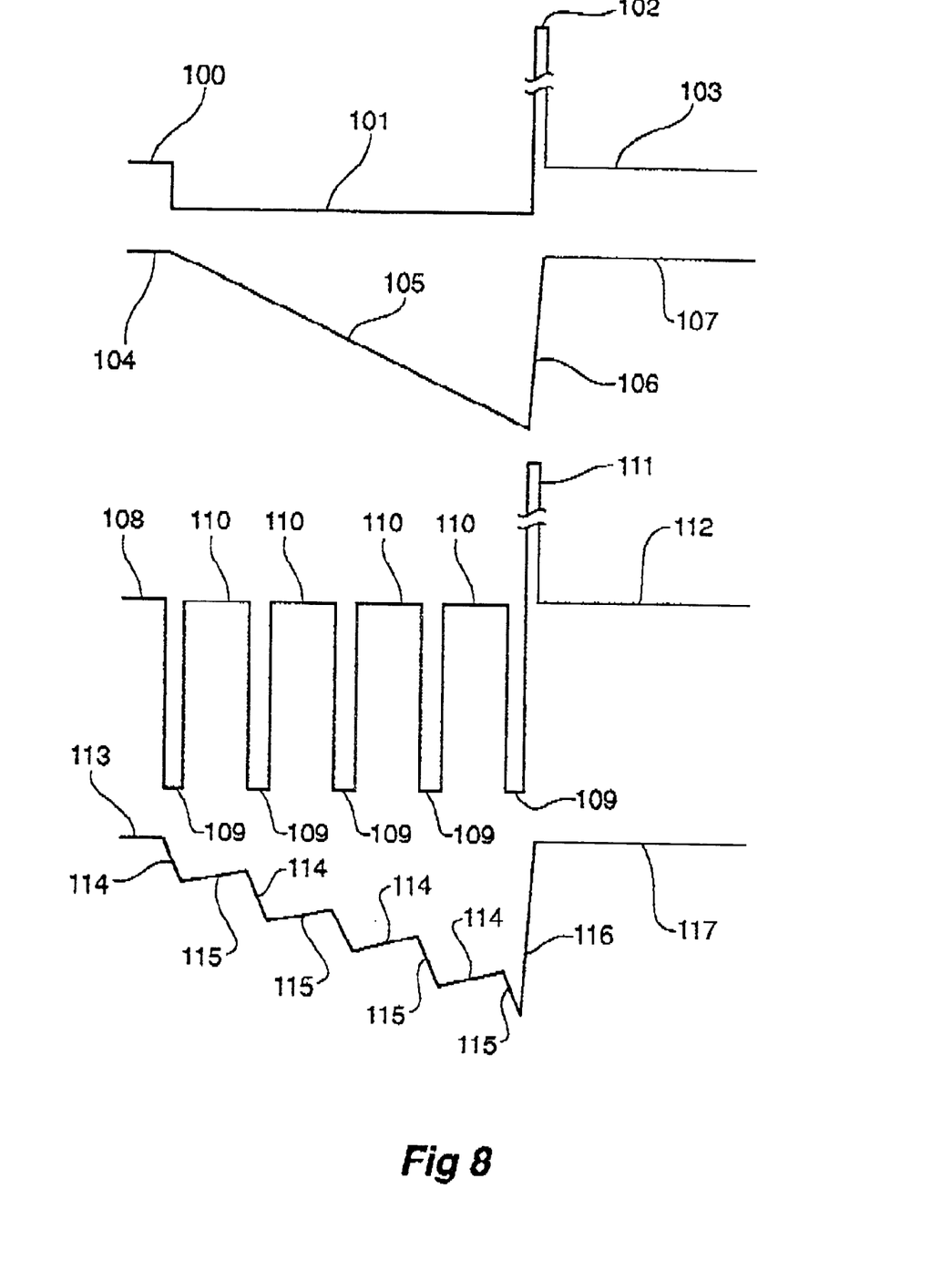
FIG. 8 shows two ways of effectively generating a long period pulse with two different voltages, but with the same period and peak transmit current shown in FIG. 6.

This is illustrated in FIG. 8 where the 100-101-102-103 is a voltage waveform applied to the transmit coil, and 104-105-106-107 is the resulting current flowing through the transmit coil.

If in FIG. 4, 42 was at ground potential (zero volts) and 45 at the higher low voltage, then during periods of back e.m.f. when switch 41 is turned on, the back e.m.f, is clamped to the forward voltage drop of diode 43 above zero volts assuming the voltage drop across the switch FET 41 is negligible when switched on. If 41 is turned off during the back e.m.f., then the back e.m.f is clamped to the high voltage 48 as usual. Period 100 is a non-transmission period with zero current flow 104. During period 101, the lower low voltage e.m.f. is applied to the transmit coil and the current increases as shown by current waveform 105. During period 102, the switch through which the voltage during 101 is applied to the transmit coil is turned off and the back e.m.f. is clamped to a high voltage. The current built up during 101 during period 102 decays to zero as shown by 106 followed by no current period 107 at which stage the back e.m.f. collapses. It remains zero during non-transmission period 103.

A current profile approximating 105 may be generated by switching the transmit coil between the higher low voltage and zero. The voltage waveform is shown as a pulse sequence 109-110. The current waveform is shown as a sequence 114-115 which rises in amplitude in a "saw-tooth" pattern until a similar current to that generated at the end of period 101, as shown as the peak current at the end of 105, is reached. During this period the switch 41 remains "on" and 42 is at zero volts. At this point the zero voltage clamping FET 41 is turned off and upon the next turn off of the switch connecting the transmit coil to the higher low voltage 45, the back e.m.f. is then clamped to the high voltage via diodes 47 and 43. If the period of the sequence of 109-110 is selected to be similar to that of 101 and the duty cycle selected so that the peak currents of 105 and 114-115 are similar, then the signal from the environment following the final high voltage back e.m.f. will be similar. Hence similar results may be obtained by either using a transmit signal 101-102 as shown in FIG. 8 or the 109-110-111 sequence, Pulse sequence 109-110 is preceded by a leading edge 108 and is followed by a trailing edge 112, each of which has the same voltage as top edges 110. The leading edge of the saw tooth sequence 114-115 is identified by level voltage 113 and the trailing edge of the sequence is a level voltage 117.

Throughout this specification the purpose has been to illustrate the invention and not to limit this.

The claims defining the invention are as follows:

1. A metal detector apparatus comprising:
   a transmit coil adapted to transmit a magnetic field when operating with electrical current flowing through the transmit coil, transmit timing control circuitry, and receive signal circuitry and receive signal processing circuitry;
   at least a first and a second power supply,
   one power supply being adapted to provide a low voltage when operating between 3 and 30V,
   and the other power supply being adapted to provide a high voltage when operating between 75 and 400V,
   a first switch connecting the coil to the said first power supply, via at least one of a diode, or diodes or passive components,
   a second switch connecting the coil to the second power supply, via at least one of a diode, or diodes or passive components,
   a third diode or switch adapted to clamp the transmit coil voltage to the second power supply, when current resulting from a back e.m.f. from the coil is flowing in one direction,
   a fourth diode or switch adapted to clamp the transmit coil voltage to the first power supply, when current resulting from a back e.m.f. from the coil is flowing in another direction,
   the timing sequence generated within the transmit timing control circuitry generating control signals for the switches,
   and a sequence of timing signals generated by the transmit timing control circuitry timing the operation of the switches such that there are periods when no current flows through the transmit coil.

2. A metal detector apparatus comprising:
   a transmit coil adapted to transmit a magnetic field when operating with electrical current flowing through the transmit coil, transmit timing control circuitry, and at least a first and a second power supply, wherein the voltage of the one supply is different to the other when operating, receive signal circuitry and receive signal processing circuitry;
   a first switch connecting the coil to the first power supply, via at least a diode, or diodes or passive components,
   a second switch connecting the coil to the second power supply, via at least a diode, or diodes or passive components,
   a third diode or switch to clamp the transmit coil voltage to a third voltage supply, when current resulting from a back e.m.f. from the coil is flowing,
   the transmit timing control circuitry producing control signals having a timing sequence and applied to the switches, said timing sequence having at least two different transmit periods, a short and a long period,
   and the timing sequence being selected to control the switches such that there are periods when no current flows through the transmit coil,
   and the timing sequence being selected to control the switches such that the total transmit coil energy at the termination of the long periods is similar to that of the total transmit coil energy at the termination of the short periods,
   and the timing sequence being selected to control the switches such that the long pulse is at least three times the duration of the short pulse,
   and the e.m.f. of the first power supply being at least double that of the second power supply.

3. A metal detector apparatus comprising:
   a transmit coil adapted to transmit a magnetic field when operating with electrical current flowing through the transmit coil, transmit timing control circuitry, and at least one power supply, receive signal circuitry and receive signal processing circuitry;
   a first switch connecting the coil to the supply, via at least one of a diode, or diodes or passive components,
   a second switch connecting the coil to 0 volts or ground potential, via at least one of a diode, or diodes or passive components,
   a third diode or switch to clamp the transmit coil voltage to the power supply, when current resulting from a back e.m.f. from the coil is flowing,
   the transmit timing control circuitry is adapted to produce control signals having a timing sequence and applied to the switches, wherein there are at least two different transmit periods, a short and a long period,
   wherein during the long period, the first switch is pulsed on and off, and the second switch is turned on at least during periods when the first switch is turned off,
   the timing sequence being selected to control the switches such that there are periods when no current flows through the transmit coil,
   the timing sequence being selected to control the switches such that the total transmit coil energy at the termination of the long periods is similar to that of the total transmit coil energy at the termination of the short periods,
   and the timing sequence being selected to control the switches such that the long pulse is at least three times the duration of the short pulse.

4. A metal detector apparatus comprising:
   a transmit coil adapted to transmit a magnetic field when operating with electrical current flowing through the transmit coil, transmit timing control circuitry, and receive signal circuitry and receive signal processing circuitry;
   at least a first and second power supply,
   wherein the voltage of the one supply is different to the other when operating, a first switch connecting the coil to the first power supply, via at least one of a diode, or diodes or passive components, an second switch connecting the coil to the second power supply, via at least one of a diode, or diodes or passive components, a third diode or switch to clamp the transmit coil voltage to the second power supply, when current resulting from a back e.m.f. from the coil is flowing in one direction, a fourth diode or switch to clamp the transmit coil voltage to the first power supply, when current resulting from a back e.m.f. from the coil is flowing in another direction, the transmit timing control circuitry producing control signals having a timing sequence and applied to for the switches, wherein there are at least two different transmit periods, a short and a long period, the timing sequence being adapted to control the switches such that there are periods when no current flows through the transmit coil, the timing sequence being selected to control the switches such that the total transmit coil energy at the termination of the long periods is similar to that of the total transmit coil energy at the termination of the short periods, and the timing sequence being selected to control the switches such that the long pulse is at least three times the duration of the short pulse, and the e.m.f. of the first power supply being at least double that of the second power supply.

5. A metal detector apparatus as in claim 4 wherein:

the second power supply is replaced by a direct connection to ground potential and, the timing sequence generated within the transmit timing control circuitry is adapted to produce control signals for the switches, wherein there are at least two different transmit periods, a short and a long period, wherein during the long period, the first switch is pulsed on and off, and the second switch is turned on at least during periods when the first switch is turned off.

6. A metal detector apparatus as in claim 2 wherein:

the second power supply is replaced by a direct connection to ground potential and, the timing sequence generated within the transmit timing control circuitry is adapted to produce control signals for the switches, wherein there are at least two different transmit periods, a short and a long period, wherein during the long period, the second switch is pulsed on and off, and the third switch is turned on at least during periods when the second switch is turned off.

* * * * *